United States Patent [19]

McCollum et al.

[11] Patent Number: 4,615,779

[45] Date of Patent: Oct. 7, 1986

[54] CATIONIC COATING COMPOSITIONS FOR ELECTRODEPOSITION OVER ROUGH STEEL

[75] Inventors: Gregory J. McCollum, Glenshaw; Roger L. Scriven, Gibsonia; Roger M. Christenson, Gibsonia; George W. Mauer, Gibsonia; Robert R. Zwack, Pittsburgh, all of Pa.

[73] Assignee: PPG Industries, Inc., Pittsburgh, Pa.

[21] Appl. No.: 698,993

[22] Filed: Feb. 7, 1985

[51] Int. Cl.$^4$ ............................................. C25D 13/06
[52] U.S. Cl. ................................ 204/181.7; 428/418
[58] Field of Search ...................... 204/181.7; 428/418

[56] References Cited

U.S. PATENT DOCUMENTS

| | | | |
|---|---|---|---|
| 3,799,854 | 3/1974 | Jerabek | 204/181 |
| 3,971,709 | 7/1976 | Ohsawa et al. | 204/181.7 |
| 4,104,147 | 8/1978 | Marchetti et al. | 204/181 C |
| 4,137,140 | 1/1979 | Belanger | 204/181.7 |
| 4,190,564 | 2/1980 | Tominaga et al. | 260/18 PT |
| 4,274,989 | 6/1981 | Tominaga et al. | 204/181.7 |
| 4,287,041 | 9/1981 | Tominaga et al. | 204/181.7 |
| 4,294,940 | 10/1981 | Hino et al. | 204/181.7 |
| 4,296,010 | 10/1981 | Tominaga | 260/29.2 TN |
| 4,454,264 | 6/1984 | Patzschke et al. | 204/181.7 |

Primary Examiner—John F. Niebling
Assistant Examiner—Terryence Chapman
Attorney, Agent, or Firm—William J. Uhl

[57] ABSTRACT

A method of cationic electrodeposition, electrocoated articles and novel electrocoating compositions are disclosed. The compositions comprise a cationic resin containing blocked isocyanate functionality and are capable of being electrodeposited over rough steel and producing extremely smooth films upon curing.

13 Claims, No Drawings

CATIONIC COATING COMPOSITIONS FOR ELECTRODEPOSITION OVER ROUGH STEEL

BACKGROUND OF THE INVENTION

1. Field of the Invention

The present invention relates to cationic electrodeposition compositions and, more particularly, to cationic electrodeposition compositions for deposition over rough steel.

2. Brief Description of the Prior Art

Electrodeposition as a coating application method involves deposition of a film-forming composition under the influence of an applied electrical potential. Electrodeposition has become increasingly important in the coatings industry because by comparison with non-electrophoretic coating means, electrodeposition offers higher paint utilization, outstanding corrosion protection and low environmental contamination. Initially, electrodeposition was conducted with the workpiece being coated serving as the anode. This was familiarly referred to as anionic electrodeposition. However, in 1972, cationic electrodeposition was introduced commercially. Since that time, cationic electrodeposition has steadily gained in popularity and today is by far the most prevalent method of electrodeposition. Throughout the world, more than 80 percent of all motor vehicles produced are given a primer coating by cationic electrodeposition.

One disadvantage associated with conventional cationic electrodeposition compositions is that they do not form smooth cured coatings over rough steel substrates. They usually deposit as thin films, that is, from about 10 to 20 microns, which, after curing, do not mask the surface roughness of the underlying steel.

Recently, cationic electrodeposition compositions have been developed which deposit as relatively thick films, that is, from about 25 to 50 microns. Typical of these compositions are those which contain blocked isocyanate curing agents and which are available from PPG Industries, Inc. under the trademark UNIPRIME. These coating compositions have been enthusiastically received by the automotive industry because they can be deposited on smooth steel substrates and topcoated without the need for primer surfacer. The resultant composite coatings have excellent appearance and chip resistance over smooth steel.

However, these coating compositions are also not completely satisfactory for primer use over rough steel substrates which are often used in automobile manufacturing. Although providing for good chip resistance, the resultant cured coating is surprisingly rough and this surface roughness causes the topcoat to reflect images in a blurry fashion which is not acceptable for automotive applications. An application of an intermediate coating (primer surfacer often sanded) is required to provide a smooth enough surface for passenger cars with acceptable topcoat appearance.

The cause of this surface roughness was at first not understood because when the thicker film build compositions were initially deposited, they completely filled the surface irregularities of the rough steel substrate. The uncured coatings appeared very smooth. However, upon curing, the coating became very rough.

Although not intending to be bound by any theory, it is believed that the primer coat which contains blocked isocyanate curing agents shrinks during cure. A principal cause of the shrinking was believed to be due to the loss of blocking agent, i.e., relatively high molecular weight alcohols such as 2-ethylhexanol and 2-hexoxyethanol. It was found that after dehydration and removal of organic solvent, the uncured film would lose about 15-20 percent of its weight upon final curing. Since the film was crosslinking, no or very little dimensional relaxation occurred to compensate for the weight loss and a high volume shrinkage resulted.

SUMMARY OF THE INVENTION

In accordance with the present invention, an electrocoating composition which is capable of providing a smooth coating over rough steel substrates is disclosed. The electrocoating composition comprises a cationic resin containing blocked isocyanate functionality characterized such that when electrodeposited over rough steel and heated to maximum flow, the incompletely cured coating has a profile of less than 0.160 microns, and upon heating to complete cure, the percentage cured film weight loss (expressed as a percentage of the film weight) is less than 10, and the product of the incompletely cured film profile and the square of the percentage cured film weight loss is less than 7.5.

The invention also provides for a method of cationic electrodeposition using the above-described compositions and for the resultantly electrocoated articles.

The present invention is unobvious because prior to the present invention, the automotive industry could not produce a smooth cathodically electrodeposited primer over rough steel. Also, the relationships between weight loss, flow and shrinkage which are necessary to anticipate such an invention were unknown. It was believed that a primer surfacer had to be applied to the electrodeposited primer and sanded to provide a smooth underlying coating for the subsequently applied topcoat. However, in accordance with the present invention, it has been found by controlling the flow out properties of the electrodeposition coating and the weight loss of the coating after it has reached its point of maximum flow before significant crosslinking, extremely smooth cured electrodeposited coatings can be obtained which approximate the smoothness of the coating with a sanded primer surfacer.

DETAILED DESCRIPTION

The coating compositions of the present invention are formulated to provide smooth electrodeposited coatings over rough steel. When the electrodeposited coating is cured, it is believed two key processes, flow out and shrinkage, occur that control the final smoothness of the cured coating. As the coated article enters the curing oven, the temperature of the coating is increased. This lowers the coating viscosity and it begins to flow and level out. Further into the curing cycle, the ability to flow reaches a maximum and then decreases as solvent evaporates and crosslinking or curing takes place. By the time crosslinking reaches a point where the coating develops solvent resistance, the coating has effectively no ability to flow. The final stages of cure produce more crosslinking which is accompanied by further loss of materials from the film such as blocking agents. Since the coating cannot flow or relax to compensate for this loss of material, it shrinks. As it shrinks, it begins to take the shape of the substrate under it. When the substrate is rough, high levels of shrinkage result in an inability of the coating to provide a smooth surface. Also, if the coating composition does not initially flow out to form a smooth surface before crosslinking begins, the final cured coating will be rough even though shrinkage may be minimal during the final stages of cure.

It is believed that certain factors affect the flow and shrinkage properties of an electrocoating composition. Although not intending to be limited by specific limits, it is believed the most important factors are the molecular weight of the principal electrocoating vehicle, the type of pigment grinding vehicle and the crosslinker used, the pigment-to-binder weight ratio, the type of pigment used, the presence of a non-volatile plasticizer in the coating composition, and in the case of blocked isocyanate curing agents, the identity of the isocyanate and the molecular weight of its blocking agent.

Two convenient tests have been developed to determine whether the electrocoating compositions are within the scope of this invention. These tests are determined over rough steel. As mentioned above, the coating composition must be of the high flow type, that is, during the early stages of the curing cycle, the electrodeposition coating must coalesce and form a smooth uncured film over the rough steel substrate.

The flow of the coating composition is measured quite easily. The coating composition is first cathodically electrodeposited over a rough steel substrate (i.e., profile from 60–70 microinches as determined with a profilometer as discussed below) in a conventional manner and is then heated at a temperature and for a time sufficient to dehydrate the coating composition, remove volatile solvents and produce the maximum flow, but insufficient to cure the coating, that is, to obtain solvent resistance, e.g., >20 acetone double rubs. Such time and temperature conditions would be, for example, those used to get a percentage solids or non-volatile content on the coating compositions which are well known in the industry. Typical times and temperatures are shown in the Examples. Heating the film under these conditions is representative of the beginning portions in the curing cycle when the coating flows or coalesces to its greatest extent prior to the coating crosslinking during the latter stages of the curing cycle when flow is restricted.

After the uncured film is treated as described above, the surface profile is measured with a profilometer and is taken as a measure of the flowability of the coating. The lower the value is, the smoother is the coating, and the greater is the flow. The temperature for determining the flowability is that required to achieve maximum flow and can be determined experimentally by simply measuring surface profile as a function of temperature at constant time. It has been found that coating compositions of the present invention preferably have profiles of less than 0.160, more preferably less than 0.080 microns.

The surface profile of both the uncured coating and the rough steel is measured with a profilometer using a moving stylus method. A direct coupled probe (Clevite Corp., now Federal Products, Inc., model 21-3100-00), consisting of a 0.0001 inch (0.000254 cm) diameter stylus and associated pre-amplification, provides an electrical output proportional to the vertical displacement of the stylus. The probe is moved horizontally at a fixed rate of 0.01 inch (0.0254 cm)/second by a mechanical driver (Surfanalyzer 150 Drive, Clevite Corp., model 21-1410-01). The resulting electrical signal is amplified by a control unit (Surfanalyzer control, Clevite Corp., model 21-1330-20) and this analogue signal is then converted to digital input to a microcomputer (Hewlett Packard Series 200, Model 16) by an analogue-to-digital converter (Nelson Analytical Inc., model 762). Conversions were made every 0.050 seconds, thus, each data point represents a horizontal displacement of 0.0005 inch (0.00127 cm). This digital signal is processed to yield a height relative to the mean surface, which is then analyzed. Calibration of the electronic and data acquisition system was verified using a standard roughness sample (Gould, Inc. model 21-9010-01) calibrated using NBS Test No. 222.22/186309 of 12/20/65.

Testing of the panels proceeded as follows:
(1) Data were taken over a 1.0 inch (2.54 cm) length (2000 data points).
(2) The mean surface was determined for the 1 inch (2.54 cm) length and the sum of the absolute values of the deviations from the mean was calculated. The profile is this sum divided by the number of points, 2000.

There was some concern in measuring the surface profile of the uncured coatings that the moving stylus might distort the uncured film and give an inaccurate reading. However, experiments have verified that the stylus pressure was not changing film profile before cure. Uncured coatings over rough steel were measured and then kept in the refrigerator at 36° F. (2° C.) for about 16 hours. The coatings were retested directly on removal from the cold. The surface profile values were within experimental error of those initially measured values. Thus, the force exerted by the stylus (about 200 mg) on the uncured coating surface does not affect profile measurements. If there is some doubt that the force of the stylus might be distorting the uncured coating, the coating can be refrigerated as described above before measuring.

Besides being highly flowable, the coating composition must also not undergo substantial weight loss during the latter stages of the curing cycle. It is during this time when the film is crosslinking that weight loss results in film shrinkage and consequent roughness over a rough substrate. Weight loss during the initial stages of the curing cycle are not as critical to surface profile since the coating is not crosslinking and can flow out to relieve the stresses brought about by the weight loss. The weight loss of the coating during the latter stages of cure when the film is crosslinking can readily be determined. First, the coating is heated to determine its flowability as described above. The weight of the film after this treatment is recorded ($W_1$). The coating is then further heated to complete the cure, i.e., standard curing conditions recommended by the coatings supplier, typically at conditions sufficient to develop at least 50 acetone double rubs. The loss in weight of the film during the completion of the cure is recorded ($W_2$). The value $W_2/W_1 \times 100$ is the percentage weight loss of the coating during crosslinking and is hereby referred to as the percentage cured film weight loss. The percentage should be less than 10, preferably less than 9, and most preferably less than 8.

It has been found that the cured film weight loss is more important in the determination of the final smoothness of the cured coating than the flowability of the coating. For acceptable coatings, it has been found that the product of the profile of the uncured coating and the square of the percentage cured film weight loss should be less than 7.5, preferably less than 7.0 and more preferably less than 6.5. For the purposes of this invention, the absolute value of the profile with no units is used. The percentage cured film weight loss for this calculation is the number itself, i.e., 8.4 percent=8.4. The product is also expressed as a unitless number.

Coating compositions of the present invention give smooth cured coatings over rough steel. This smoothness can be determined directly by a profilometer. However, an even more sensitive measurement of the smoothness of the cured electrodeposited film is to top coat it with a glossy automotive quality topcoat, i.e., 20° gloss of at least 80, and measure the distinctness of image (DOI) of the cured topcoat. The distinctness of image is the sharpness with which the cured topcoat reflects images. Topcoats which reflect images in a blurry fashion have a low DOI, whereas coatings which are more mirror-like in appearance have high DOI. It has been found that the DOI is directly related to the roughness of the electrodeposition coating. The rougher the coating, the lower the DOI. Coating compositions of the present invention preferably provide for DOI's of at least 80 with black NAD enamels such as described in the Examples. The DOI can be measured with a Dori-Gen Meter D47-6 manufactured by Hunter Laboratories.

Besides the roughness of the electrodeposition primer, the DOI will also be a function of the topcoat, and how it is applied, i.e., spraying conditions. Since the DOI is a function of spraying conditions, a more meaningful measure of the DOI is the difference of the DOI of the topcoated primer being evaluated versus a standard or control which is topcoated under the same conditions as the primer being evaluated. This can be accomplished by placing the electrocoated panel being evaluated and a standard electrocoated panel in the same spray rack and topcoating them at the same time with the same topcoat composition. The standard electrocoated panel would be prepared from a rough steel panel having the same roughness as the electrocoated rough steel panel being evaluated. The electrodeposition coating on the control panel would be at the same thickness as the primer being evaluated, i.e., about 30 microns. A primer surfacer is applied to the standard electrocoated panel and sanded smooth. Typical compositions and coating conditions for preparing the standard test panel are described in the Examples.

As mentioned above, both the standard and the electrocoated panels being evaluated are topcoated under the same conditions as described above. The difference in DOI's between the two is a measure of the smoothness of the electrodeposition coating being evaluated. The closer the DOI's, the smoother the electrodeposition coating. The coating composition of the present invention preferably provides for DOI differences (DOI of standard minus DOI of invention) of less than 10, more preferably less than 8, and most preferably less than 7 units.

The resinous ingredients of the coating compositions of the present invention comprise as essential ingredients the resinous film-forming binder which comprises the cationic resin and crosslinking agent.

Examples of cationic resins are amine salt group-containing polymers and quaternary ammonium salt group-containing polymers which are the acid-solubilized reaction products of polyepoxides and primary amines, secondary amines, tertiary amines and mixtures thereof. These cationic resins are present in combination with blocked isocyanate curing agents. The isocyanate can be present as a fully blocked isocyanate or the isocyanate can be partially blocked and reacted into the amine salt polymer backbone.

The polyepoxides which are used in the practice of the invention are polymers having a 1,2-epoxy equivalency greater than one and preferably about two, that is, polyepoxides which have on an average basis two epoxy groups per molecule. The preferred polyepoxides are polyglycidyl ethers of cyclic polyols. Particularly preferred are polyglycidyl ethers of polyhydric phenols such as bisphenol A. These polyepoxides can be produced by etherification of polyhydric phenols with epihalohydrin or dihalohydrin such as epichlorohydrin or dichlorohydrin in the presence of alkali. Examples of polyhydric phenols are 2,2-bis(4-hydroxyphenyl)propane, 1,1-bis-(4-hydroxyphenyl)ethane, 2-methyl-1,1-bis-(4-hydroxyphenyl)propane, 2,2-bis-(4-hydroxy-3-tertiarybutylphenyl)propane, bis-(2-hydroxynaphthyl)methane, 1,5-dihydroxy-3-naphthalene or the like.

Besides polyhydric phenols, other cyclic polyols can be used in preparing the polyglycidyl ethers of cyclic polyol derivatives. Examples of other cyclic polyols would be alicyclic polyols, particularly cycloaliphatic polyols, such as 1,2-cyclohexanediol, 1,4-cyclohexanediol, 1,2-bis(hydroxymethyl)cyclohexane, 1,3-bis(-hydroxymethyl)cyclohexane and hydrogenated bisphenol A.

The polyepoxides have molecular weights of at least 200 and preferably within the range of 200 to 2000, and more preferably about 340 to 2000.

The polyepoxides are preferably chain extended with a polyether or a polyester polyol which increases rupture voltage of the composition and enhances flow and coalescence. Examples of polyether polyols and conditions for chain extension are disclosed in U.S. Pat. No. 4,468,307, column 2, line 67, to column 4, line 52, the portions of which are hereby incorporated by reference. Examples of polyester polyols for chain extension are disclosed in U.S. Pat. No. 4,148,772, column 4, line 42, to column 5, line 53, the portions of which are hereby incorporated by reference.

The polyepoxide is reacted with a cationic group former, for example, an amine and acid. The amine can be a primary, secondary or tertiary amine and mixtures thereof.

The preferred amines are monoamines, particularly hydroxyl-containing amines. Although monoamines are preferred, polyamines such as ethylene diamine, diethylene triamine, triethylene tetraamine, N-(2-aminoethyl)ethanolamine and piperizine can be used but their use in large amounts is not preferred because they are multifunctional and have a greater tendency to gel the reaction mixture than monoamines.

Tertiary and secondary amines are preferred to primary amines because and primary amines are polyfunctional with regard to reaction to epoxy groups and have a greater tendency to gel the reaction mixture. When using polyamines or primary amines, special precautions should be taken to avoid gelation. For example, excess amine can be used and the excess can be vacuum stripped at the completion of the reaction. Also, the polyepoxide resin can be added to the amine to insure that excess amine will be present.

Examples of hydroxyl-containing amines are alkanolamines, dialkanolamines, trialkanolamines, alkylalkanolamines, arylalkanolamines and arylalkylalkanolamines containing from 2 to 18 carbon atoms in the alkanol, alkyl and aryl chains. Specific examples include ethanolamine, N-methylethanolamine, diethanolamine, N-phenylethanolamine, N,N-dimethylethanolamine, N-methyldiethanolamine and triethanolamine.

Amines which do not contain hydroxyl groups such as mono, di and tri-alkyl amines and mixed alkyl-aryl amines and substituted amines in which the substituents are other than hydroxyl and in which the substituents do not detrimentally affect the epoxy-amine reaction can also be used. Specific examples of these amines are ethylamine, propylamine, methylethylamine, diethylamine, N,N-dimethylcyclohexylamine, triethylamine, N-benzyldimethylamine, dimethylcocoamine and dimethyltallowamine. Also, amines such as hydrazine and propylene imine can be used. Ammonia can also be used and is considered for the purposes of this application to be an amine.

Mixtures of the various amines described above can be used. The reaction of the primary and/or secondary amine with the polyepoxide resin takes place upon mixing the amine with the product. The reaction can be conducted neat, or, optionally in the presence of suitable solvent. The reaction may be exothermic and cooling may be desired. However, heating to a moderate temperature, that is, within the range of 50° to 150° C., may be used to hasten the reaction.

The reaction product of the primary or secondary amine with the polyepoxide resin attains its cationic character by at least partial neutralization with acid. Examples of suitable acids include organic and inorganic acids such as formic acid, acetic acid, lactic acid, phosphoric acid and carbonic acid. The extent of neutralization will depend upon the particular product involved. It is only necessary that sufficient acid be used to disperse the product in water. Typically, the amount of acid used will be sufficient to provide at least 30 percent of the total theoretical neutralization. Excess acid beyond that required for 100 percent total theoretical neutralization can also be used.

In the reaction of the tertiary amine with the polyepoxide resin, the tertiary amine can be prereacted with the acid such as those mentioned above to form the amine salt and the salt reacted with the polyepoxide to form the quaternary ammonium salt group-containing resin. The reaction is conducted by mixing the amine salt and the polyepoxide resin together in the presence of water. Typically, the water is employed on the basis of about 1.75 to about 20 percent by weight based on total reaction mixture solids.

Alternately, the tertiary amine can be reacted with the polyepoxide resin in the presence of water to form a quaternary ammonium hydroxide group-containing polymer which, if desired, may be subsequently acidified. The quaternary ammonium hydroxide-containing polymers can also be used without acid, although their use is not preferred.

In forming the quaternary ammonium base group-containing polymers, the reaction temperature can be varied between the lowest temperature at which reaction reasonably proceeds, for example, room temperature, or in the usual case, slightly above room temperature, to a maximum temperature of 100° C. (at atmospheric pressure). At greater than atmospheric pressure, higher reaction temperatures can be used. Preferably, the reaction temperature ranges between about 60° to 100° C. Solvent for the reaction is usually not necessary, although a solvent such as a sterically hindered ester, ether or sterically hindered ketone may be used if desired.

In addition to the primary, secondary and tertiary amines disclosed above, a portion of the amine which is reacted with the polyepoxide-polyether polyol product can be the ketimine of a polyamine. This is described in U.S. Pat. No. 4,104,147 in column 6, line 23, to column 7, line 23, the portions of which are hereby incorporated by reference. The ketimine groups will decompose upon dispersing the amine-epoxy reaction product in water resulting in free primary amine groups which would be reactive with curing agents which are described in more detail below.

Besides resins containing amine salts and quaternary ammonium base groups, resins containing other cationic groups can be used in the practice of this invention. Examples of other cationic resins are quaternary phosphonium resins and ternary sulfonium resins. However, resins containing amine salt groups and quaternary ammonium base groups are preferred and the amine salt group-containing resins are the most preferred.

The extent of cationic group formation of the resin should be selected that when the resin is mixed with aqueous medium, a stable dispersion will form. A stable dispersion is one which does not settle or is one which is easily redispersible if some sedimentation occurs. In addition, the dispersion should be of sufficient cationic character that the dispersed resin particles will migrate towards the cathode when an electrical potential is impressed between an anode and a cathode immersed in the aqueous dispersion.

In general, most of the cationic resins prepared by the process of the invention contain from about 0.1 to 3.0, preferably from about 0.3 to 1.0 milliequivalents of cationic group per gram of resin solids.

The cationic resinous binders should preferably have weight average molecular weights, as determined by gel permeation chromatography using a polystyrene standard, of less than 100,000, more preferably less than 75,000 and most preferably less than 50,000 in order to achieve high flowability.

Blocked isocyanates which are employed in the coating compositions of the invention are organic polyisocyanates and can be those in which the isocyanato groups have been reacted with a compound so that the resultant blocked or capped isocyanate is stable to active hydrogens at room temperature but reactive with active hydrogens at elevated temperatures, usually between 90° and 200° C. Aromatic and aliphatic including cycloaliphatic polyisocyanates may be used and representative examples include 2,4- or 2,6-toluene diisocyanate including mixtures thereof and p-phenylene diisocyanate, tetramethylene and hexamethylene diisocyanates and dicyclohexylmethane-4,4'-diisocyanate, isophorone diisocyanate, diphenylmethane-4,4'-diisocyanate and polymethylene polyphenylisocyanate. Higher polyisocyanates such as triisocyanates can be used. An example would include triphenylmethane-4,4',4"-triisocyanate. NCO-prepolymers such as reaction products of polyisocyanates with polyols such as neopentyl glycol and trimethylolpropane and with polymeric polyols such as polycaprolactone diols and triols (NCO/OH equivalent ratio greater than 1) can also be used. A mixture containing diphenylmethane-4,4'-diisocyanate and polymethylene polyphenylisocyanate is preferred because it provides better flow and reduced crystallinity with the preferred low molecular weight blocking agents methanol and ethanol described below. One of the preferred polyisocyanate mixtures is available from Mobay Chemical Co. as MONDUR MR.

The blocking agent for the polyisocyanate is one which does not contribute substantially to weight loss when the film is heated to cure. Examples of such materials are those which, although they volatilize from the film on cure, have an average molecular weight of 76 or less and would include alcohols such as methanol, ethanol and propanol and mixtures thereof. By average molecular weight is meant the sum of the molecular weights of the blocking agents multiplied by their respective percentage by weight. Thus, a blocking agent having a molecular weight greater than 76 could be used with a blocking agent having a molecular weight less than 76 as long as the weighted average were below 76. Preferred are mixtures of methanol and ethanol. Blocking agents which have average molecular weights greater than 76 result in excessive weight loss on curing leading to film shrinkage and a rough appearance over a rough steel substrate.

As mentioned above, the blocked polyisocyanate can be used in two similar ways. The polyisocyanate can be fully blocked, that is, no free isocyanate groups remain and then added to the cationic polymer to form a two-component resin. Or, the polyisocyanate can be partially blocked, for example, half-blocked diisocyanate, so that there is one remaining reactive isocyanate group. The half-blocked isocyanate can then be reacted with active hydrogen groups in the polymer backbone under conditions which will not unblock the blocked isocyanate group. This reaction makes the isocyanate part of the polymer molecule and a one-component resin.

Whether fully blocked or partially blocked, sufficient polyisocyanate is present with the cationic polymer so that there are about 0.1 to about 1.2 isocyanate groups for each active hydrogen, i.e., hydroxyl, primary and secondary amino and thiol.

Besides the blocked isocyanates which are described above, blocked polyisocyanates can be prepared by reacting diamines and carbonates, for example, isophorone diamine could be reacted with ethylene carbonate in a 1:2 molar ratio to form, in effect, beta-hydroxy ethyl alcohol fully blocked isophorone diisocyanate. Procedures for preparing such reaction products, both fully blocked and partially blocked polyisocyanates which are reacted into the polymer backbone, are disclosed in U.S. patent applications Ser. No. 562,320, filed Dec. 16, 1983, and Ser. No. 596,183, filed Apr. 2, 1984, both to Moriarity et al. Also, masked polyisocyanates such as aminimides, for example,

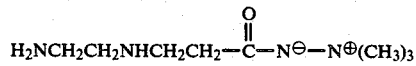

and macrocyclic ureas as described in U.S. Pat. No. 4,154,391 which upon heating rearrange to cure through isocyanate groups are also considered as blocked isocyanates in accordance with the present invention.

Preferably, the molecular weight (weight average as determined by gel permeation chromatography using a polystyrene standard) is less than 15,000, more preferably less than 5000 in order to achieve high flowability.

The cationic resin and the blocked isocyanate are the principal resinous ingredients in the electrocoating compositions. They are usually present in amounts of about 50 to 100 percent by weight of resin solids.

Preferably, the electrodepositable coating compositions of the present invention are of the high film build type, that is, they are capable of being electrodeposited and cured as a substantially continuous thick film. High film build compositions as described below are preferred because they are highly flowable. By thick is meant a film having a dry film thickness of at least 25 and usually from about 25 to 75 microns. Preferably, the film will have a thickness of at least 30 and more preferably of at least 35 microns.

Besides the resinous ingredients described above, the electrocoating compositions usually contain a pigment which is incorporated into the composition in the form of a paste. The pigment paste is prepared by grinding or dispersing a pigment into a grinding vehicle and optional ingredients such as wetting agents, surfactants and defoamers. Grinding is usually accomplished by the use of ball mills, Cowles dissolvers, continuous attritors and the like until the pigment has been reduced to the desired size and has been wet by and dispersed by the grinding vehicle. After grinding, the particle size of the pigment should be as small as practical, generally, a Hegman grinding gauge of about 6 to 8 is usually employed.

Examples of pigment grinding vehicles are those described in European Application Publication Nos. 0107098, 0107089 and 0107088 with that of Publication No. 0107098 being preferred.

Pigments which can be employed in the practice of the invention include titanium dioxide, basic lead silicate, carbon black, strontium chromate, iron oxide, clay and phthalocyanine blue. Pigments with high surface areas and oil absorbencies should be used judiciously because they can have an undesirable effect on coalescence and flow.

The pigment-to-resin weight ratio is also fairly important and should be preferably less than 0.5:1, more preferably less than 0.4:1, and usually about 0.2 to 0.4:1. Higher pigment-to-resin solids weight ratios have also been found to adversely affect coalescence and flow.

The coating compositions of the invention can contain optional ingredients such as plasticizers, surfactants, wetting agents, defoamers and anti-cratering agents. Examples of surfactants and wetting agents include alkyl imidazolines such as those available from Geigy Industrial Chemicals as GEIGY AMINE C, acetylenic alcohols available from Air Products and Chemicals as SURFYNOL. Examples of defoamers are FOAM KILL 63, a hydrocarbon oil-containing inert diatomaceous earth. Examples of anticratering agents are polyoxyalkylene-polyamine reaction products such as those described in U.S. Pat. No. 4,432,850. These optional ingredients, when present, constitute from about 0 to 30 percent by weight of resin solids. Plasticizers are preferred optional ingredients because they promote flow. Examples are high boiling water immiscible materials such as mixed ethylene-propylene oxide adducts of nonyl phenols and bisphenol A. When plasticizers are used, they are used in amounts of about 5 to 15 percent by weight resin solids.

Curing catalysts such as tin catalysts are usually present in the composition. Examples are dibutyltin dilaurate and dibutyltin oxide. When used, they are typically present in amounts of about 0.05 to 1 percent by weight tin based on weight of total resin solids.

The electrodepositable coating compositions of the present invention are dispersed in aqueous medium. The term "dispersion" as used within the context of the present invention is believed to be a two-phase translucent or opaque aqueous resinous system in which the resin is in the dispersed phase and water the continuous phase. The average particle size diameter of the resinous phase is about 0.1 to 10, preferably less than 5 microns. The concentration of the resinous products in the aqueous medium is, in general, not critical, but ordinarily the major portion of the aqueous dispersion is water. The aqueous dispersion usually contains from about 3 to 75, typically 5 to 50 percent by weight resin solids. Aqueous resin concentrates which are to be further diluted with water at the job site generally range from 30 to 75 percent by weight resin solids. Fully diluted electrodeposition baths generally have resin solids contents of about 3 to 25 percent by weight.

Besides water, the aqueous medium may also contain a coalescing solvent. Useful coalescing solvents include hydrocarbons, alcohols, esters, ethers and ketones. The preferred coalescing solvents include alcohols, polyols and ketones. Specific coalescing solvents include 2-propanol, butanol, 2-ethylhexanol, isophorone, 4-methoxy-2-pentanone, ethylene and propylene glycol and the monoethyl, monobutyl, monohexyl and 2-ethylhexyl ethers of ethylene glycol. The amount of coalescing solvent is not unduly critical and is generally between about 0 to 15 percent by weight, preferably about 0.5 to 5 percent by weight based on total weight of the aqueous medium.

In the process of electrodeposition employing the electrodepositable coating compositions, the aqueous composition is placed in contact with an electrically conductive anode and an electrically conductive cathode. Upon passage of the electric current between the anode and the cathode while in contact with the aqueous coating compositions described above, an adherent film of the coating composition will deposit in a substantially continuous manner on the cathode. The conditions under which electrodeposition is carried out are well known in the art. Electrodeposition is usually carried out at constant voltage. The applied voltage may vary greatly and can be, for example, as low as one volt or as high as several thousand volts, although typically between 50 volts and 500 volts are employed. Current density is usually between about 1.0 ampere and 15 amperes per square foot (10.8–161.5 amperes per square meter) and tends to decrease quickly during electrodeposition indicating the formation of a continuous self-insulating film.

Any electroconductive substrate, especially metal such as steel, zinc, aluminum, copper, magnesium, or the like can be electrodeposited with the coating compositions of the present invention. However, the invention is particularly desirable for the coating of rough substrates such as untreated, and pretreated rough steel and rough galvanized steel. By rough is meant a substrate which has a surface profile of at least 50, usually between 50 to 150 microinches (at least 1.27, usually between 1.27–3.81 microns), as determined by profilometer measurements as described above.

After deposition, the coating is cured at elevated temperatures by any convenient method such as by baking in ovens. The curing temperature will typically be conducted over the range of from about 120° to 250° C., preferably from about 120° to 190° C. for anywhere from about 10 to 60 minutes.

The invention will be described below in greater detail with reference to the examples to which the invention is not limited. The parts and percentages given in the examples are by weight unless otherwise indicated.

VEHICLE RESINS

The following examples show the preparation of various cationic electrodeposition resins. The resins are prepared by reacting polyglycidyl ethers of polyphenols with amines. The amine reaction product is then combined with a blocked isocyanate crosslinking agent, partially neutralized with acid and dispersed in deionized water.

EXAMPLE A

A cationic electrodeposition resin was prepared from the following mixture of ingredients:

| Ingredients | Parts by Weight |
|---|---|
| EPON 828[1] | 524.0 |
| Bisphenol A-ethylene oxide adduct (1/6 molar ratio) | 189.0 |
| Xylene | 46.0 |
| Bisphenol A | 152.0 |
| Benzyldimethylamine (catalyst) | 0.39 |
| Benzyldimethylamine | 0.97 |
| Crosslinker[2] | 694 |
| Diketimine[3] | 59.0 |
| N—methylethanolamine | 50 |
| DOWANOL PPH[4] | 72 |
| 88% Aqueous lactic acid | 47.5 |
| Surfactant[5] | 23 |
| Deionized water | 2457 |

[1]Epoxy resin solution made from reacting epichlorohydrin and bisphenol A having an epoxy equivalent of about 188, commercially available from Shell Chemical Company.
[2]The polyurethane crosslinker was prepared from the following mixture of ingredients:

| Ingredients | Parts by Weight |
|---|---|
| Polyaromatic polyisocyanate[a] | 1300.0 |
| Methanol | 160.0 |
| Ethanol | 161.0 |
| Trimethylolpropane | 67.0 |
| Methyl isobutyl ketone | 723.0 |
| Dibutyltin dilaurate | 1.8 |

[a]Mixture containing polymethylene-polyphenylisocyanate and diphenylmethane-4,4'-diisocyanate available from Mobay Chemical Co. as MONDUR MR.
The MONDUR MR, methyl isobutyl ketone and dibutyltin dilaurate were charged to a reaction flask under a nitrogen atmosphere. The ethanol/methanol blend was added over six hours maintaining a temperature of less than 60° C. When the addition was complete, the reaction mixture was held at 45–50° C. for about one hour. The trimethylolpropane was then added and the reaction mixture heated to 95° C. and held until no isocyanate was detectable by IR.
[3]Diketimine derived from diethylenetriamine and methyl isobutyl ketone (73% solids in methyl isobutyl ketone).
[4]1-Phenoxy-2-propanol from Dow Chemical Co.
[5]Cationic surfactant prepared by blending 120 parts of alkyl imidazoline commercially available from Geigy Industrial Chemicals as GEIGY AMINE C, 120 parts by weight of an acetylenic alcohol commercially available from Air Products and Chemicals Inc. as SURFYNOL 104, 120 parts by weight of 2-butoxyethanol and 221 parts by weight of deionized water and 19 parts of glacial acetic acid.

The EPON 828, bisphenol A-ethylene oxide adduct, bisphenol A and methyl isobutyl ketone were charged to a reaction vessel and heated together under a nitrogen atmosphere to 140° C. The first portion of benzyldimethylamine was added and the reaction mixture allowed to exotherm to 183° C. and refluxed under reduced pressure to remove azeotropically any water present. The reaction mixture was cooled to 160° C., held for ½ hour, cooled further to 145° C. and the second portion of benzyldimethylamine added. The reaction mixture was held at 145° C. for 2 hours at which time a reduced Gardner-Holdt viscosity (50 percent resin solids in 2-methoxypropanol) of Q-R was obtained. The polyurethane crosslinker, diketimine derivative and N-methylethanolamine were added and the temperature of the reaction mixture brought to 118° C. and held at this temperature for 1.5 hours. The DOWANOL PPH was added and the reaction mixture was dispersed in a mixture of the lactic acid, surfactant and deionized water. Further portions of water were gradually added to bring the resin solids to 33 percent. Stripping in vacuum to remove organic solvent gave a dispersion having a solids content of 37.6 percent. The crosslinker comprised about 33.5 percent of the resin solids.

EXAMPLE B

A cationic electrodeposition resin similar to Example A was prepared with the exception of the polyurethane crosslinker which was prepared from the following mixture of ingredients:

| Ingredients | Parts by Weight |
| --- | --- |
| Isophorone diisocyanate | 888 |
| Mixture ethanol/methanol (95/5 volume ratio) | 107.5 |
| Methanol | 49.8 |
| Trimethylopropane | 179.0 |
| Methyl isobutyl ketone | 524.7 |
| Dibutyltin dilaurate | 1.75 |

The isophorone diisocyanate, methyl isobutyl ketone and dibutyltin dilaurate were charged to a reaction flask and heated under a nitrogen atmosphere to 45° C. The ethanol/methanol mixture and the second portion of methanol were added slowly over a two-hour period keeping the reaction temperature below 60° C. When the addition was complete, the reaction was maintained between 50°–55° C. for about 1 hour until an NCO equivalent of 407 was obtained. The trimethylolpropane was then added and the reaction mixture heated to 95° C. until no isocyanate was detected by IR.

The cationic resin prepared with this crosslinker had a resin solids content of 36.7 percent. The crosslinker comprised 35 percent of the resin solids.

EXAMPLE C

A cationic resin similar to that of Example A was prepared with the exception that a polyurethane crosslinker was prepared from the following mixture of ingredients:

| Ingredients | Parts by Weight |
| --- | --- |
| Polyaromatic polyisocyanate[1] | 1300 |
| Ethanol/methanol (95/5 volume mixture) | 363 |
| Trimethylolpropane | 89.4 |
| Methyl isobutyl ketone | 755 |
| Dibutyltin dilaurate | 1.80 |

[1] Mixture containing polymethylene polyphenyl isocyanate and diphenylmethane-4,4'-diisocyanate, commercially available from Mobay Chemical Company as MONDUR MRS.

The procedure for preparing the crosslinker was as generally described in Example A. The ethanol was added slowly to the reaction mixture maintaining the temperature below 60° C. Addition and holding was conducted until an NCO equivalent of 1197 was obtained. The trimethylolpropane was added and the reaction mixture was raised to 90° C. until an IR analysis indicated the disappearance of NCO groups.

The cationic resin prepared with this crosslinker had a resin solids content of 37.6 percent. The crosslinker comprised 25 percent of the resin solids.

EXAMPLE D

A cationic resin similar to Example A was prepared with the exception that the polyurethane crosslinker was prepared from the following mixture of ingredients:

| Ingredients | Parts by Weight |
| --- | --- |
| MONDUR MR | 1300 |
| 1-propanol | 270.5 |
| Ethanol/methanol (95/5 volume mixture) | 175.6 |
| Trimethylolpropane | 67.0 |
| Methyl isobutyl ketone | 780 |
| Dibutyltin dilaurate | 1.8 |

The procedure for preparing the crosslinker was as generally described in Example A.

The cationic resin prepared with this crosslinker had a resin solids content of 38.9 percent. The crosslinker comprised 30 percent of the resin solids.

EXAMPLE E

A cationic resin similar to Example A was prepared with the exception that the polyurethane crosslinker was prepared from the following mixture of ingredients:

| Ingredients | Parts by Weight |
| --- | --- |
| Toluene diisocyanate (TDI)[1] | 522 |
| Polycaprolactone triol[2] | 303 |
| Ethanol/methanol (95/5 volume mixture) | 80.6 |
| Methanol | 37.3 |
| Methyl isobutyl ketone | 405.0 |
| Dibutyltin dilaurate | 1.0 |

[1] 80/20 2,4-/2,6-isomer mixture.
[2] Available from Union Carbide Corp. as PCP-0301.

The TDI and methyl isobutyl ketone were charged to a reaction flask under a nitrogen atmosphere. The ethanol and methanol blended together were added slowly keeping the temperature below 60° C. When the addition was complete, the reaction mixture was held at 45°–50° C. until the mixture had an isocyanate equivalent of 363. The PCP-0301 was then added and the dibutyltin dilaurate added dropwise. The reaction mixture began to exotherm and was held at 60° C. for about 2½ hours until no isocyanate was detectable by IR.

The cationic resin prepared with this crosslinker had a resin solids content of 39.3 percent. The crosslinker comprised 35 percent of the resin solids.

EXAMPLE F

A cationic resin was prepared as generally described in Example E above with the exception of the crosslinker used. The crosslinker of this example was more crystalline than that of Example E. The crosslinker was prepared from the following mixture of ingredients:

| Ingredients | Parts by Weight |
| --- | --- |
| TDI | 1740 |

| Ingredients | Parts by Weight |
|---|---|
| Methanol | 160.2 |
| Ethanol/methanol (95/5 volume mixture) | 226.9 |
| Trimethylolpropane | 447 |
| Methyl isobutyl ketone | 1105 |
| Dibutyltin dilaurate | 2.75 |

The TDI and methyl isobutyl ketone were charged to a reaction vessel under a nitrogen atmosphere. The methanol and ethanol blended together were added slowly while maintaining the temperature of the reaction mixture below 60° C. The trimethylolpropane was added and the reaction mixture heated to about 53° C. followed by the addition of the dibutyltin dilaurate which initiated a vigorous exotherm. The reaction mixture was held at 75° C. until no isocyanate was detected by IR. The reaction mixture had a gel-like structure and was thinned with an additional 55 milliliters of methyl isobutyl ketone. The cationic resin prepared with this crosslinker had a resin solids content of 40.3 percent. The crosslinker comprised 25 percent of the resin solids.

EXAMPLE G

A cationic resin similar to that of Example B was prepared with the exception of the polyurethane crosslinker which was prepared from the following mixture of ingredients:

| Ingredients | Parts by Weight |
|---|---|
| TRITON X-15[1] | 1553 |
| Trimethylolpropane | 46.9 |
| MONDUR MR | 910 |
| Methyl isobutyl ketone | 1076 |
| Dibutyltin dilaurate | 2.5 |
| Lactic acid | 2.7 |

[1]Ethoxolated nonyl phenol commercially available from Rohm and Haas.

The TRITON X-15, trimethylolpropane, methyl isobutyl ketone and lactic acid (to neutralize residual base used in preparation of TRITON X-15) were charged to a reaction vessel under a nitrogen atmosphere and heated to reflux and held for about 4 hours. The reaction mixture was then cooled to 60°-70° C., followed by the addition of the dibutyltin dilaurate. The MONDUR MR was added slowly to the reaction mixture while keeping the temperature below 65° C. Addition was complete over a 40-minute period. The reaction mixture was held at about 90°-95° C. for about 2 hours until no isocyanate was detectable by IR.

The cationic resin prepared with this crosslinker had a resin solids content of 35 percent. The crosslinker comprised 37 percent of the resin solids.

EXAMPLE H

A cationic resin similar to Example A was prepared from the exception of the crosslinker which was formed from half-capping toluene diisocyanate (80/20 2,4-/2,6-isomer mixture) with 2-hexoxyethanol and reacting this product with trimethylolpropane in a 3:1 molar ratio. The crosslinker is present as a 70 percent solids solution in methyl isobutyl ketone and butanol (9:1 weight ratio).

The cationic resin prepared with this crosslinker had a resin solids content of 38.9 percent. The crosslinker comprised 35 percent of the resin solids.

EXAMPLE I

A cationic electrodeposition resin was prepared as generally described in U.S. Pat. No. 4,104,147 from the following mixture of ingredients:

| Ingredients | Parts by Weight |
|---|---|
| EPON 829[1] | 727.6 |
| PCP-0200[2] | 268.4 |
| Xylene | 36.1 |
| Bisphenol A | 197.8 |
| Benzyldimethylamine | 3.8 |
| Capped isocyanate crosslinker[3] | 901.3 |
| Diketimine of Example A | 73.4 |
| N—methylethanolamine | 59.1 |
| 2-Hexoxyethanol | 76.5 |
| Acetic acid | 33.5 |
| Cationic surfactant of Example A | 29.4 |
| Deionized water | 1793.1 |

[1]Epoxy resin solution made from reacting epichlorohydrin and bisphenol A having an epoxy equivalent of about 188 commercially available from Shell Chemical Company.
[2]Polycaprolactone diol commercially available from Union Carbide Corp.
[3]Polyurethane crosslinker formed from half-capping toluene diisocyanate (80/20 2,4-/2,6-isomer mixture) with 2-ethoxyethanol and reacting this product with trimethylolpropane in a 3:1 molar ratio. The crosslinker is present as a 70 percent solids solution in a 90/10 mixture of methyl isobutyl ketone and n-butanol.

The EPON 829, PCP-0200 and xylene were charged to a reaction vessel and heated under a nitrogen atmosphere to 210° C. The reaction was held at reflux for about ½ hour to remove water. The reaction mixture was cooled to 150° C. and the bisphenol A and 1.6 parts of the benzyldimethylamine (catalyst) added. The reaction mixture was heated to 150°-190° C. and held at this temperature for about 1½ hours and then cooled to 130° C. The remaining portion of the benzyldimethylamine catalyst was added and the reaction mixture held at 130° C. for 2½ hours until a reduced Gardner-Holdt viscosisty (50 percent resin solids solution in 2-ethoxyethanol) of P was obtained.

The polyurethane crosslinker, the diketimine derivative and the N-methylethanolamine were then added and the temperature of the reaction mixture brought to 110° C. and held at this temperature for 1 hour.

The 2-hexoxyethanol was added and the reaction mixture was dispersed in water by adding the reaction mixture to a mixture of the acetic acid, deionized water and the cationic surfactant. This dispersion was diluted to 32 percent solids with deionized water and vacuum stripped to remove organic solvent to give a dispersion having a solids content of 36 percent.

ADDITIVES

Example J

A polyoxyalkylenepolyamine-polyepoxide adduct having an amine to epoxide equivalent ratio of 1.34/1 was prepared as follows: A polyepoxide intermediate was first prepared by condensing EPON 829 and bisphenol A as follows:

| Ingredients | Parts by Weight |
|---|---|
| EPON 829 | 136.1 |
| Bisphenol A | 39.6 |
| 2-Butoxyethanol | 52.3 |

The EPON 829 and Bisphenol A were charged to a reaction vessel under a nitrogen blanket and heated to 160°-190° C. for ½ hour. The reaction mixture was cooled to 150° C. and the 2-butoxyethanol added. The reaction mixture had a solids content of 76.5 percent and an epoxy equivalent of 500.

A polyoxypropylenediamine having a molecular weight of 2000 commercially available from Jefferson Chemical Company as JEFFAMINE D-2000 was reacted with a polyepoxide intermediate described above as follows:

| Ingredients | Parts by Weight |
| --- | --- |
| JEFFAMINE D-2000 | 5066.2 |
| Polyepoxide intermediate | 2601.4 |
| 2-Butoxyethanol | 630.8 |
| 88% Aqueous lactic acid | 210.72 |
| Deionized water | 10542.9 |

The JEFFAMINE D-2000 was charged to a reaction vessel under a nitrogen atmosphere and heated to 90° C. The polyepoxide intermediate was added over the period of about ½ hour. At the completion of the addition, the reaction mixture was heated to 130° C., held for 3 hours, followed by the addition of the 2-butoxyethanol. The reaction mixture was then dispersed by blending with the lactic acid and deionized water. The dispersion had a solids content of 38.7 percent.

Example K

An additive similar to that of Example J was prepared from the following mixture of ingredients:

| Ingredients | Parts by Weight |
| --- | --- |
| JEFFAMINE D-2000 | 159.2 |
| Polyepoxide intermediate of Example J | 84.7 |
| 2-Butoxyethanol | 4.6 |
| Polyurethane crosslinker[1] | 133.7 |
| 88% Aqueous lactic acid | 6.6 |
| Surfactant of Example A | 4.9 |
| Deionized water | 477.4 |

[1]Polyurethane crosslinker formed from half-capping toluene diisocyanate (80/20 2,4-/2,6-isomer mixture) with 2-butoxyethanol and reacting this product with trimethylolpropane in a 3:1 molar ratio. The crosslinker is present as a 70 percent solids solution in 2-ethoxy-ethanol.

The JEFFAMINE D-2000 was charged to a reaction vessel under a nitrogen atmosphere and heated to 90° C. The polyepoxide intermediate was added over the period of about ½ hour. At the completion of the addition, the reaction mixture was heated to 130° C., held for 3 hours, followed by the addition of the 2-butoxyethanol and polyurethane crosslinker. The reaction mixture was then solubilized by blending with lactic acid, the surfactant and deionized water. The adduct had a solids content of 39.3 percent.

PIGMENT PASTES

Example L

A pigment paste as described in European Published Application No. 107098 was prepared by reacting dimethylaminopropylamine with a fatty acid followed by quaternization with a monoepoxide as follows:

The reaction of the dimethylaminopropylamine with the fatty acid was prepared from the following ingredients:

| Ingredients | Parts by Weight |
| --- | --- |
| EMPOL 1010[1] | 285.7 |

-continued

| Ingredients | Parts by Weight |
| --- | --- |
| Dimethylaminopropylamine | 127.73 |

[1]A dimerized linoleic acid available from Emery Industries.

To a properly equipped reaction vessel was charged the EMPOL 1010 and the dimethylaminopropylamine with a resulting exotherm to 75° C. The reaction mixture was heated to reflux through a vigreaux column for about 2 hours over a temperature range of 135°–140° C. Thereafter, the reaction mixture was cooled to 132° C. and a Dean-Stark trap inserted on the top of the vigreaux column. Following this, water and unreacted dimethylaminopropylamine were removed from the reaction mixture by distillation over a period of 8 hours. The resultant reaction product was vacuum stripped to remove residual amine.

The reaction product described above was reacted with butyl glycidyl ether as follows:

| Ingredients | Parts by Weight |
| --- | --- |
| Reaction product as described above | 301.5 |
| 2-Butoxyethanol | 208.5 |
| 88% Lactic acid | 90 |
| Deionized water | 71.3 |
| Butyl glycidyl ether | 128.1 |

The reaction product and the 2-butoxyethanol were charged to a properly equipped reaction vessel and heated to 50° C. followed by adding the lactic acid. There was a resulting exotherm with the reaction temperature being maintained over the range of 55°–65° C. for about 15 minutes. Thereafter, the deionized water was added and the reaction mixture was allowed to react for about 15 minutes over the temperature range of 55°–65° C. This was followed by adding the butyl glycidyl ether and heating the reaction mixture to 75° C. and allowing it to react for 2 hours over the temperature range of 75°–85° C. The resultant reaction mixture had a solids content of 60.7 percent.

A pigment paste using the pigment grinding vehicle prepared as described above was prepared from the following mixture of ingredients:

| Ingredients | Parts by Weight |
| --- | --- |
| Deionized water | 236 |
| Pigment grinding vehicle as described above | 12 |
| TiO$_2$ | 540 |
| Lead silicate | 35 |
| Carbon black | 18 |
| 50/50 weight mixture of SURFYNOL 104 and ethylene glycol | 2 |
| Deionized water | 157 |
| Catalyst paste of Example P (infra) | 55 |

The above ingredients were ground in a sand mill to a Hegman No. 7+ grind.

Example M

A quaternizing agent for use in preparing a pigment grinding vehicle was prepared from the following mixture of ingredients:

| Ingredients | Parts by Weight | Solids |
| --- | --- | --- |
| 2-Ethylhexanol half-capped | 320.0 | 304 |

| Ingredients | Parts by Weight | Solids |
|---|---|---|
| toluene diisocyanate in methyl isobutyl ketone | | |
| Dimethylethanolamine | 87.2 | 87.2 |
| 88% Aqueous lactic acid solution | 117.6 | 88.2 |
| 2-Butoxyethanol | 39.2 | |

The 2-ethylhexanol half-capped toluene diisocyanate was added to the dimethylethanolamine in a suitable reaction vessel at room temperature. The mixture exothermed and was stirred for 1 hour at 80° C. Lactic acid was then charged followed by the addition of 2-butoxyethanol. The reaction mixture was stirred for about 1 hour at 65° C. to form the desired quaternizing agent.

A pigment grinding vehicle was prepared from the following mixture of ingredients:

| Ingredients | Parts by Weight | Solids |
|---|---|---|
| EPON 829 | 710 | 682 |
| Bisphenol A | 289.6 | 289.6 |
| 2-Ethylhexanol monourethane of 2,4-toluene diisocyanate in methyl isobutyl ketone | 406 | 386.1 |
| Quaternizing agent prepared as described above | 496.3 | 421.9 |
| Deionized water | 71.2 | — |
| 2-Butoxyethanol | 1490 | — |

The EPON 829 and bisphenol A were charged under a nitrogen atmosphere to a suitable reaction vessel and heated to 150°–160° C. to initiate an exotherm. The reaction mixture was permitted to exotherm for 1 hour at 150°–160° C. The reaction mixture was then cooled to 120° C. and the 2-ethylhexanol half-capped toluene diisocyanate added. The temperature of the reaction mixture was held at 110°–120° C. for 1 hour followed by the addition of the 2-butoxyethanol. The reaction mixture was then cooled to 85°–90° C., homogenized and then charged with water followed by the addition of the quaternizing agent. The temperature of the reaction mixture was held at 80°–85° C. until an acid value of about 1 was obtained.

Clay, carbon black, basic lead silicate and strontium chromate were dispersed in the pigment grinding vehicle prepared as described immediately above in the following charge ratio:

| Ingredients | Parts by Weight |
|---|---|
| Quaternary ammonium salt group-containing pigment grinding vehicle prepared as described immediately above | 20.75 |
| Clay | 23.30 |
| Basic lead silicate | 4.09 |
| Carbon black | 3.27 |
| Strontium chromate | 2.04 |
| Deionized water | 42.55 |

The above ingredients were mixed together and ground in a mill to a Hegman No. 7 grind.

Example N

A pigment paste similar to Example M was prepared from the following mixture of ingredients:

| Ingredients | Parts by Weight |
|---|---|
| Quaternary ammonium salt group-containing pigment grinding vehicle prepared as described above | 226.36 |
| Deionized water | 388.90 |
| Titanium dioxide | 564.31 |
| Carbon black | 16.54 |
| Lead silicate | 33.08 |
| Catalyst paste of Example O, infra | 87.38 |

The above ingredients were mixed together and ground in a mill to a Hegman No. 7 grind.

Example O

Dibutyltin oxide catalyst was dispersed in the grinding vehicle prepared as described above in Example M in the following charge ratio:

| Ingredients | Parts by Weight |
|---|---|
| Quaternary ammonium salt group-containing pigment grinding vehicle prepared as described in Example M | 145 |
| Deionized water | 321.6 |
| Dibutyltin oxide | 200 |

The above ingredients were mixed together and ground in a mill to a Hegman No. 7 grind.

Example P

A pigment grinding vehicle as described in European Published Application No. 107089 was formed from reacting in the presence of acetic acid a polyglycidyl ether of bisphenol A with N-dodecyl dimethylamine as follows:

| Ingredients | Parts by Weight |
|---|---|
| ARMEEN DM18D[1] | 418.5 |
| Glacial acetic acid | 84.6 |
| Deionized water | 35.25 |
| EPON 828 | 265 |
| 2-Butoxyethanol | 378.3 |

[1]N—octadecyl dimethylamine available from Armak Chemical Division.

The ARMEEN DM18D, 100 parts of the 2-butoxyethanol and the deionized water were charged to a properly equipped reaction vessel, heated to 50° C. followed by the addition of the acetic acid. The resultant mixture was allowed to react for a period of 15 minutes over a temperature range of 45°–55° C. Thereafter, at about 51° C., EPON 828 and the remaining 2-butoxyethanol were added and the mixture heated to 75° C. and held over a temperature range of 75°–85° C. for 4½ hours. The resultant mixture was cooled and stored.

A catalyst paste was prepared with the pigment grinding vehicle prepared as described immediately above as follows:

| Ingredients | Parts by Weight |
|---|---|
| Deionized water | 363 |
| Pigment grinding vehicle | 47 |
| Dibutyltin oxide | 571 |
| 50/50 mixture of SURFYNOL 104 and ethylene glycol | 3 |
| Deionized water | 16 |

The ingredients described above were added in the order indicated to a mill and ground to a Hegman No. 7 grind.

CATIONIC ELECTRODEPOSITION PAINTS

Examples 1-10 are of various cationic electrodeposition paints. Examples 1-5 are of electrocoating compositions of the present invention characterized by high flow on baking (low profiles) and low percentage cured film weight loss. When electrodeposited and cured over rough steel, the films are smooth and when topcoated, the cured topcoat has a high distinctness of image (DOI) which does not vary much from a standard in which the topcoat is applied over a sanded primer surfacer.

Examples 6-10 are comparative examples characterized by either or both, poor flows on baking (high profiles) and high cured film weight loss. When electrodeposited and cured over rough steel the cured topcoats are rough, having low topcoated DOI's which are considerably lower than the standard.

In all the examples unless otherwise indicated, zinc phosphate pretreated rough steel panels (profiles=60-70 microinches, 1.52-1.78 microns) were cathodically electrodeposited in the paints (20-25 percent solids, pigment-to-binder weight ratio of about 0.3/1) at 275 volts for 2 minutes at bath temperatures of 24°-32° C. The times and temperatures for measurement of the incompletely cured film roughness include a first heating at 230° F. (110° C.) for 60 minutes to dehydrate the electrodeposited film and to complete the precure flow out. The films at this stage are uncured having essentially no acetone resistance. The times and temperatures for determining the percentage cured film weight loss were to further heat the films at 340° F. (171° C.) for 30 minutes to complete cure. The films at this stage were completely cured and had greater than 100 acetone double rubs. An acetone double rub is rubbing the coated substrate back and forth (double rub) with an acetone saturated cloth until the coating was rubbed away from the substrate. The cured films had a thickness of about 30 microns.

For determining DOI's, the cured electrodeposited coatings over the rough steel substrates were topcoated with an automotive quality topcoat composition which is based on a non-aqueous dispersion acrylic enamel available from PPG Industries, Inc. as DXF 9385 Black. The composition is reduced with an organic solvent mixture comprising 20.8 percent n-heptane, 24.2 percent acetone, 12.6 percent toluene, 13.2 percent of Dibasic ester from E. I. Du Pont de Nemours, 11.3 percent 2-ethoxyethanol, 8.7 percent of an aromatic naphtha available from Exxon Oil Company as Aromatic 150 and 9.2 percent of naphtha available from Ashland Chemical Company as Hi-Initial VM&P Naphtha so as to obtain a 17-second viscosity measured with a No. 4 Ford cup. The topcoat is applied by automatic spraying and is cured by flashing at ambient conditions for 15 minutes followed by heating for 30 minutes at 250° F. (127° C.) to produce a coating having a dry thickness of about 37.5 microns. The DOI of the topcoat is measured with a Dori-Gen Meter D47-6 manufactured by Hunter Laboratories.

The DOI of the standard is determined by electrodepositing and curing a coating composition as set forth in Example 8, infra, over the zinc phosphate pretreated rough steel. The cured electrodeposited coating is then coated with a primer surfacer which is cured and then sanded smooth. A topcoat as described above is applied to the sanded primer surfacer, cured and the DOI measured, all as described above.

The primer-surfacer is available from PPG Industries, Inc. as E-5584. It is reduced with 2-butoxyethylacetate to a viscosity of 23 seconds as measured with a No. 4 Ford cup. The primer surfacer is applied by automatic spraying and is cured by flashing at ambient conditions for 15 minutes followed by heating for 30 minutes at 325° F. (165° C.) to produce a coating having a dry film thickness of 30 microns. The cured film was sanded smooth with 500 grit sandpaper.

The automatic spraying for both the primer surfacer and the topcoat was done with a SPRAYMATION 310160 Automatic Test Panel Spray Unit available from Spraymation Inc. The spray gun used was a Binks Model 610, open gun pressure 60 psi (4.22 kg/cm$^2$), traverse speed 80 rpm.

Topcoat spraying of both the standard and the comparative test panels was done by positioning the panels on the same spray rack and spraying at the same time.

A summary of the results appears in Table I at the end of the Examples.

EXAMPLE 1

The following example employs a low molecular weight cationic resinous binder and blocked polyisocyanate crosslinker and contains a pigment grinding vehicle and a non-volatile plasticizer to give high flow. The molecular weights of the blocking agents of the blocked diisocyanate are low so as to give a low percentage cured film weight loss.

The cationic paint in the form of an electrodeposition bath was prepared from the following mixture of ingredients:

| Ingredients | Parts by Weight |
| --- | --- |
| Cationic resin of Example A | 1513.1 |
| Additive of Example J (at 36% solids) | 182.8 |
| Plasticizer[1] | 65.8 |
| Deionized water | 1641.2 |
| Pigment paste of Example L | 397.1 |

[1]Paraplex WP-1, commercially available from Rohm and Haas Company.

The bath was adjusted to a pH of 6.25 by the addition of aqueous lactic acid and the paint was ultrafiltered to a specific conductivity of 1200. The profile of the uncured film was 2.5 microinches (0.064 microns); the percentage cured film weight loss was 8.4, and the product of the profile and the square of the percentage cured film weight loss was 4.51 (0.064×(8.4)$^2$=4.51). The DOI of the topcoat was 85.4; the DOI of the standard was 90.5, and the difference from the standard was 5.1 units.

EXAMPLE 2

The following example is similar to Example 1 above with the exception that the blocked diisocyanate crosslinker was that of Example B (reaction product of isophorone diisocyanate, methanol/ethanol/trimethylolpropane). The paint in the form of an electrodeposition bath was prepared from the following mixture of ingredients:

| Ingredients | Parts by Weight |
| --- | --- |
| Cationic resin of Example B | 1632.7 |
| Additive of Example J | 170.0 |

-continued

| Ingredients | Parts by Weight |
|---|---|
| WP-1 | 65.8 |
| DOWANOL PPH | 30.0 |
| Deionized water | 1503 |
| Pigment paste of Example L | 397.1 |

The bath was adjusted to a pH of 6.36 by the addition of aqueous lactic acid and was ultrafiltered to a specific conductivity of 1290. The profile of the uncured film was 2.9 microinches (0.074 microns); the percentage cured film weight loss (cure at 360° F. (183° C.) for 30 minutes) was 9.1, and the product of the profile and the square of the percentage cured film weight loss was 6.13. The DOI of the topcoat was 84.1 and the difference from the standard was 7.2 units.

EXAMPLE 3

The following cationic electrodeposition paint was similar to that of Example 1 with the exception that the crosslinker was that of Example C (reaction product of a polyaromatic polyisocyanate-ethanol-methanol and trimethylolpropane). The paint in the form of an electrodeposition bath was prepared from the following mixture of ingredients:

| Ingredients | Parts by Weight |
|---|---|
| Cationic resin of Example C | 1593.6 |
| Additive of Example J | 170.0 |
| WP-1 | 65.8 |
| Deionized water | 1573.5 |
| Pigment paste of Example L | 397.1 |
| DOWANOL PPH | 30.0 |

The bath was adjusted to a pH of 6.29 by the addition of aqueous lactic acid and was ultrafiltered to a specific conductivity of 1200. The profile of the uncured film was 2.9 microinches (0.074 microns); the percentage cured film weight loss was 7.1, and the product of the profile and the square of the percentage cured film weight loss was 3.73. The DOI of the topcoat was 84.6 and the difference from the standard was 6.7 units.

EXAMPLE 4

A cationic electrodeposition paint similar to Example 1 was prepared with the exception that the crosslinker was that of Example D (reaction product of polyaromatic polyisocyanate, propanol and trimethylolpropane). The paint in the form of an electrodeposition bath was prepared from the following mixture of ingredients:

| Ingredients | Parts by Weight |
|---|---|
| Cationic resin of Example D | 1646.2 |
| Additive of Example J | 170.0 |
| WP-1 | 65.8 |
| DOWANOL PPH | 30.0 |
| Deionized water | 1490.9 |
| Pigment paste of Example L | 397.1 |

The bath was adjusted to a pH of 6.23 by the addition of aqueous lactic acid and was ultrafiltered to a specific conductivity of 1150. The profile of the uncured film was 2.4 microinches (0.061 microns); the percentage cured film weight loss was 7.7, and the product of the profile and the square of the percentage cured film weight loss was 3.62. The DOI of the topcoat was 82.5 and the difference from the standard was 5.8 units.

EXAMPLE 5

A cationic electrodeposition paint similar to Example 1 was prepared with the exception that the crosslinker was that of Example E (reaction product of toluene diisocyanate, methanol, ethanol and polycaprolactone triol). The paint in the form of an electrodeposition bath was prepared from the following mixture of ingredients:

| Ingredients | Parts by Weight |
|---|---|
| Cationic resin of Example E | 1524.7 |
| Additive of Example J | 170.0 |
| WP-1 | 65.8 |
| DOWANOL PPH | 30.0 |
| Deionized water | 1612.4 |
| Pigment paste of Example L | 397.1 |

The bath was adjusted to a pH of 6.27 by the addition of aqueous lactic acid and was ultrafiltered to a specific conductivity of 1080. The profile of the uncured film was 1.9 microinches (0.048 microns); the percentage cured film weight loss was 8.2, and the product of the profile and the square of the percentage cured film weight loss was 3.23. The DOI of the topcoat was 81.3 and the difference from the standard was 7.3 units.

EXAMPLE 6

A cationic electrodeposition paint similar to that of Example 5 was prepared with the exception that the crosslinker was that of Example G (reaction product of toluene diisocyanate, methanol, ethanol and trimethylolpropane). The crosslinker was more crystalline than that of Example 5 and restricted the flow of the coating. The paint in the form of an electrodeposition bath was prepared from the following ingredients:

| Ingredients | Parts by Weight |
|---|---|
| Cationic resin of Example F | 1505.5 |
| Additive of Example J | 170.0 |
| WP-1 | 65.8 |
| DOWANOL PPH | 30.0 |
| Deionized water | 1630.6 |
| Pigment paste of Example L | 397.1 |

The bath was adjusted to a pH of 6.18 with lactic acid and was ultrafiltered to a specific conductivity of 1080. The profile of the uncured film was 6.4 microinches (0.163 microns); the percentage cured film weight loss was 7.7, and the product of the profile and the square of the percentage cured film weight loss was 9.66. The DOI of the topcoat was 77.1 and the difference from the standard was 12.8 units.

EXAMPLE 7

A cationic electrodeposition paint similar to that of Example 1 was prepared with the exception that the crosslinker was that of Example H (reaction product of polyaromatic polyisocyanate, trimethylolpropane and ethoxolated nonyl phenol which is a high molecular weight blocking agent). Although providing good flow, the cured film weight loss was excessive resulting in a rough cured film. The paint in the form of an electrodeposition bath was prepared from the following ingredients:

| Ingredients | Parts by Weight |
| --- | --- |
| Cationic resin of Example G | 1637.2 |
| Additive of Example J | 170.0 |
| WP-1 | 65.8 |
| DOWANOL PPH | 30.0 |
| Deionized water | 1499.9 |
| Pigment paste of Example L | 397.1 |

The bath was adjusted with lactic acid to a pH of 6.28 and ultrafiltered to a conductivity of 1030. The profile of the uncured film was 3.5 microinches (0.089 microns); the percentage cured film weight loss was 17.3, and the product of the profile and the square of the percentage cured film weight loss was 26.64. The DOI of the topcoat was 70.9 and the difference from the standard was 17.7 units.

EXAMPLE 8

A cationic paint similar to that of Example 1 was prepared with the exception that the pigment paste of Example N was used in place of that of Example L. The paste contained a pigment grinding vehicle which restricted flow and resulted in a rough uncured film. The paint in the form of an electrodeposition bath was prepared from the following ingredients:

| Ingredients | Parts by Weight |
| --- | --- |
| Cationic resin of Example A | 1692.7 |
| Additive of Example J | 170.0 |
| WP-1 | 65.8 |
| DOWANOL PPH | 27.5 |
| Deionized water | 1373.8 |
| Pigment paste of Example N | 470.2 |

The bath was adjusted with lactic acid to a pH of 6.32 and was ultrafiltered to a conductivity of 1300. The profile of the uncured film was 6.9 microinches (0.175 microns); the percentage cured film weight loss was 7.2, and the product of the profile and the square of the percentage cured film weight loss was 9.07. The DOI of the topcoat was 79.1 and the difference from the standard was 12.2 units.

EXAMPLE 9

A cationic electrodeposition paint similar to that of Example 8 was prepared with the exception that the crosslinker was that of Example H (condensate of TDI, 2-hexoxyethanol, trimethylolpropane). Although the composition flowed out well, the weight loss on curing was high resulting in a rough cured film. The paint in the form of an electrodeposition bath was prepared from the following ingredients:

| Ingredients | Parts by Weight |
| --- | --- |
| Cationic resin of Example H | 6484.8 |
| Additive of Example K | 1097.7 |
| WP-1 | 203.0 |
| Deionized water | 9421.3 |
| Pigment paste of Example N | 1793.2 |

The bath had a pH of 6.28 and was ultrafiltered to a conductivity of 1040. The profile of the uncured film was 3.2 microinches (0.081 microns); the percentage cured film weight loss was 13.6, and the product of the profile and the square of the percentage cured film weight loss was 14.98. The DOI of the topcoat was 77.1 and the difference from the standard was 13.4 units.

EXAMPLE 10

A cationic electrodeposition paint was prepared from the cationic resin of Example I and the pigment paste of Example M. The cationic resin used a high molecular weight blocking agent in the crosslinker which resulted in high cured film weight loss. The pigment paste of Example M had a composition which restricted flow. A very rough cured film resulted. The paint in the form of an electrodeposition bath was prepared from the following ingredients:

| Ingredients | Parts by Weight |
| --- | --- |
| Cationic resin of Example I | 1617 |
| Pigment paste of Example M | 460 |
| Catalyst paste of Example O | 14.8 |

The bath had a pH of 6.2 and was ultrafiltered to a conductivity of 1200. The profile of the uncured film was 8.2 microinches (0.21 microns); the percentage cured film weight loss was 16.6, and the product of the profile and the square of the percentage cured film weight loss was 57.87. The DOI of the topcoat was 71.9 and the difference from the standard was 18.6 units.

TABLE I

Summary of Smoothness Properties of the Electrodeposited Films of Examples 1-10 Over Rough Steel

| Example No. | Profile of Steel (microns) | Profile of Uncured Coating (microns) | Percentage Cured Film Weight Loss | Product of Profile and (Percentage Cured Film Weight Loss)$^2$ | DOI of Topcoat | Units DOI Different from Standard |
| --- | --- | --- | --- | --- | --- | --- |
| 1 | 1.62 | 0.064 | 8.4 | 4.51 | 85.4 | 5.1 |
| 2 | 1.64 | 0.074 | 9.1 | 6.13 | 84.1 | 7.2 |
| 3 | 1.63 | 0.074 | 7.1 | 3.73 | 84.6 | 6.7 |
| 4 | 1.59 | 0.061 | 7.7 | 3.62 | 82.5 | 5.8 |
| 5 | 1.68 | 0.048 | 8.2 | 3.23 | 81.3 | 7.3 |
| 6 | 1.62 | 0.163 | 7.7 | 9.66 | 77.1 | 12.8 |
| 7 | 1.60 | 0.089 | 17.3 | 26.64 | 70.9 | 17.7 |
| 8 | 1.62 | 0.175 | 7.2 | 9.07 | 79.1 | 12.2 |
| 9 | 1.65 | 0.081 | 13.3 | 14.98 | 77.1 | 13.4 |
| 10 | 1.58 | 0.21 | 16.6 | 57.87 | 71.9 | 18.6 |

We claim:

1. A method of electrodepositing an electroconductive substrate which serves as a cathode in an electrical circuit comprising said cathode and an anode immersed in an aqueous electrocoating composition, said method comprising passing electric current between the anode and the cathode to cause the electrocoating composition to deposit on the cathode as a substantially continuous film, heating the electrodeposited film at an elevated temperature to form a cured film, characterized in that the electrocoating composition comprises a cationic resin containing blocked polyisocyanate functionality, said cationic resin being derived from a polyepoxide and having cationic groups selected from amine salt groups, quaternary ammonium base groups, quaternary phosphonium groups and ternary sulfonium groups, said cationic resin having a molecular weight less than 50,000; the blocking agent for the polyisocyanate being volatile under curing conditions and having an average molecular weight of 76 or less; said electrocoating composition being pigmented in which the pigments have a size of 6 to 8 as determined with a Hegman grinding gauge, the pigment-to-resin weight ratio being less than 0.4:1; the electrocoating composition being further characterized such that upon electrodeposition and heating to maximum flow, the incompletely cured coating has a profile less than 0.160 micron, and upon heating to complete cure, the percentage cured film weight loss is less than 10, and the product of the profile and the square of the percentage cured film weight loss is less than 7.5.

2. The method of claim 1 in which the cured film has a thickness of at least 20 microns.

3. The method of claim 2 in which the cured film has a thickness of at least 30 microns.

4. The method of claim 1 in which the substrate is steel which has a surface profile greater than 1.27 microns.

5. A coated article having an electroconductive substrate and cathodically electrodeposited thereon a substantially continuous film applied by the method of claim 1.

6. A coated article as set forth in claim 5 having a film thickness of at least 20 microns.

7. The coated article of claim 6 having a film thickness of at least 30 microns.

8. The coated article of claim 5 in which the substrate is steel having a surface profile greater than 1.27 microns.

9. The method of claim 1 in which the pigments are ground in a pigment grinding vehicle which is a quaternized resinous reaction product containing fatty acid moieties.

10. The method of claim 1 in which the blocking agent for the polyisocyanate is selected from methanol, ethanol, propanol and mixtures thereof.

11. The method of claim 1 in which the polyisocyanate is a mixture containing polyphenylisocyanate and diphenylmethane-4,4'-diisocyanate.

12. A method of electrodepositing a rough electroconductive substrate which serves as a cathode in an electrical circuit comprising said cathode and an anode immersed in an aqueous electrocoating composition, said method comprising passing electric current between the anode and the cathode to cause the electrocoating composition to deposit on the cathode as a substantially continuous film, heating the electrodeposited film at an elevated temperature to form a cured film, characterized in that the substrate has a surface profile greater than 1.27 microns; the electrocoating composition comprises a cationic resin containing blocked polyisocyanate functionality, said cationic resin being derived from a polyepoxide and having cationic groups selected from amine salt groups, quaternary ammonium base groups, quaternary phosphonium groups and ternary sulfonium groups, said cationic resin having a molecular weight less than 50,000; the blocking agent for the polyisocyanate being volatile under curing conditions and having an average molecular weight or 76 or less, said blocking agent including methanol, ethanol, propanol and mixtures thereof; said electrocoating composition being pigmented in which the pigments have a size of 6 to 8 as determined with a Hegman grinding gauge and the pigments being ground in a pigment grinding vehicle which is a quaternized resinous reaction product containing fatty acid moieties, the pigment-to-resin weight ratio being less than 0.4:1; said electrocoating composition being characterized such that upon electrodeposition and heating to maximum flow, the incompletely cured coating has a profile less than 0.160 micron and upon heating to complete cure, the percentage cured film weight loss is less than 10, and the product of the profile and the square of the percentage cured film weight loss is less than 7.5.

13. The method of claim 12 in which the polyisocyanate is a mixture containing diphenyl-methane-4,4'-diisocyanate and polymethylene polyphenylisocyanate.

* * * * *